United States Patent
Ma et al.

(10) Patent No.: US 8,161,918 B2
(45) Date of Patent: Apr. 24, 2012

(54) WATER HEATER

(75) Inventors: Hongfei Ma, Nanjing (CN); Zhihua Zhang, Nanjing (CN); Lei Cao, Nanjing (CN); Hyungsik Lee, Mequon, WI (US); Gu Qinghai, Nanjing (CN)

(73) Assignee: Aos Holding Company, Wilmington, DE (US)

( * ) Notice: Subject to any disclaimer, the term of this patent is extended or adjusted under 35 U.S.C. 154(b) by 771 days.

(21) Appl. No.: 12/197,831

(22) Filed: Aug. 25, 2008

(65) Prior Publication Data

US 2010/0043728 A1    Feb. 25, 2010

(51) Int. Cl.
 *F24D 19/08* (2006.01)
(52) U.S. Cl. ..................... 122/15.1; 122/18.1
(58) Field of Classification Search ............... 122/15.1, 122/18.1, 13.01, 367.1
See application file for complete search history.

(56) References Cited

U.S. PATENT DOCUMENTS

| | | | |
|---|---|---|---|
| 675,919 A * | 6/1901 | Arvonen | 237/17 |
| 1,993,725 A * | 3/1935 | Walker et al. | 122/45 |
| 2,348,767 A | 5/1944 | Walker et al. | |
| 2,715,390 A * | 8/1955 | Marks et al. | 122/24 |
| 2,911,957 A * | 11/1959 | Kumm | 122/13.01 |
| 2,937,625 A * | 5/1960 | Meyers | 122/33 |
| 4,241,723 A | 12/1980 | Kitchen | |
| 4,492,185 A | 1/1985 | Kendall et al. | |
| 4,541,410 A | 9/1985 | Jatana | |
| 4,641,631 A | 2/1987 | Jatana | |
| 4,766,883 A | 8/1988 | Cameron et al. | |
| 5,022,352 A | 6/1991 | Osborne et al. | |
| 5,085,579 A | 2/1992 | Moore, Jr. et al. | |
| 5,115,798 A | 5/1992 | Moore, Jr. et al. | |
| 5,179,914 A | 1/1993 | Moore, Jr. et al. | |
| 5,357,907 A | 10/1994 | Moore, Jr. et al. | |
| 5,636,598 A | 6/1997 | Moore, Jr. | |
| 5,735,237 A * | 4/1998 | Phillip et al. | 122/18.5 |
| 6,036,480 A * | 3/2000 | Hughes et al. | 431/353 |
| RE37,240 E * | 6/2001 | Moore et al. | 122/406.1 |
| 6,354,248 B1 | 3/2002 | Bourke | |
| 6,435,174 B1 * | 8/2002 | Spilde et al. | 126/378.1 |
| 6,561,183 B1 * | 5/2003 | Spilde et al. | 126/378.1 |
| 6,681,723 B1 | 1/2004 | Amendt et al. | |
| 7,258,080 B2 * | 8/2007 | Missoum et al. | 122/18.1 |
| 7,316,206 B2 * | 1/2008 | Akkala et al. | 122/244 |
| 7,353,821 B2 * | 4/2008 | Saksena | 126/369 |
| 7,836,856 B2 * | 11/2010 | Mullen et al. | 122/155.2 |

OTHER PUBLICATIONS

A.O. Smith Corporation. Commercial High Efficiency Water Heaters Brochure. "Cyclone XHE BTH-120-BTH-300 the most efficient water heater line ever built." Form No. AOSC94474A. 2002.
A.O. Smith Water Heaters. Commercial Full Line Catelog, Better Choices for Every Application. "Cyclone XHE BTH Gas Model" pp. 14-18. Form No. ACBCA00105. Oct. 2006.

* cited by examiner

Primary Examiner — Gregory A Wilson
(74) Attorney, Agent, or Firm — Michael Best & Friedrich LLP

(57) ABSTRACT

A storage-type water heater includes a tank enclosing a volume of water, the tank having an upper portion and a lower portion, a chamber adjacent the lower portion of the tank and adapted to at least partially enclose a source of a heated fluid, and a helical tube heat exchanger at least partially enclosed within the tank and fluidly connected to the chamber. The helical tube directs the heated fluid from the lower portion to the upper portion of the tank and promotes heat exchange between the water in the tank and the heated fluid flowing therethrough.

21 Claims, 4 Drawing Sheets

WATER HEATER

BACKGROUND

The present invention relates to water heaters.

SUMMARY

In one embodiment, the invention provides a storage-type water heater comprising: a water storage tank having a generally vertical center axis and having upper and lower ends; a combustion chamber adjacent the lower end of the tank; a burner generating products of combustion in the combustion chamber; a substantially straight flue tube extending within the tank generally along the axis, the flue tube having a closed lower end and having an open upper end; and a helical tube heat exchanger within the tank, the helical tube being generally centered on the axis, the helical tube having an upper end communicating with the flue tube at a point between the upper and lower ends of the flue tube, and the helical tube having a lower end communicating with the combustion chamber such that the products of combustion flow from the combustion chamber into the helical tube, then into the flue tube and then out of the upper end of the flue tube; a portion of the flue tube extending downward from the point at which the helical tube communicates with the flue tube so as to form a condensing water trap in the closed lower end of the flue tube.

In another embodiment, the invention provides a storage-type water heater comprising: a tank enclosing a volume of water, the tank having an upper portion and a lower portion; a chamber adjacent the lower portion of the tank and adapted to at least partially enclose a source of a heated fluid; and a helical tube heat exchanger at least partially enclosed within the tank and fluidly connected to the chamber, the helical tube directing the heated fluid from the lower portion to the upper portion of the tank and promoting heat exchange between the water in the tank and the heated fluid flowing through the helical tube.

In another embodiment, the invention provides a water heater comprising: a storage tank for supporting water therein, the storage tank having an upper portion and a lower portion; a burner chamber adjacent the lower portion of the tank and at least partially enclosing a burner for generating products of combustion; a helical tube heat exchanger at least partially enclosed within the tank and fluidly connected to the burner chamber, the helical tube directing a flow of the products of combustion in a direction generally defined from the lower portion to the upper portion of the tank and promoting heat exchange between the water in the tank and the products of combustion flowing therethrough; a substantially straight flue tube at least partially enclosed within the tank and extending upwardly to the upper portion of the tank, the helical tube being fluidly connected to the flue tube above a lower portion of the flue tube for directing the flow of the products of combustion from the lower portion of the tank to the upper portion of the tank; a condensing water trap system including a water tube extending from the lower portion of the flue tube to the exterior of the tank, the condensing water trap system being operable to collect water condensed within the flue tube at the lower portion thereof and direct the condensed water through the water tube to the exterior of the tank; and a blower coupled to the upper portion of the tank and fluidly connected to an upper portion of the flue tube, the blower being operable to affect the products of combustion to at least partially generate the flow of the products of combustion from the burner chamber through the helical tube and then through the flue tube.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
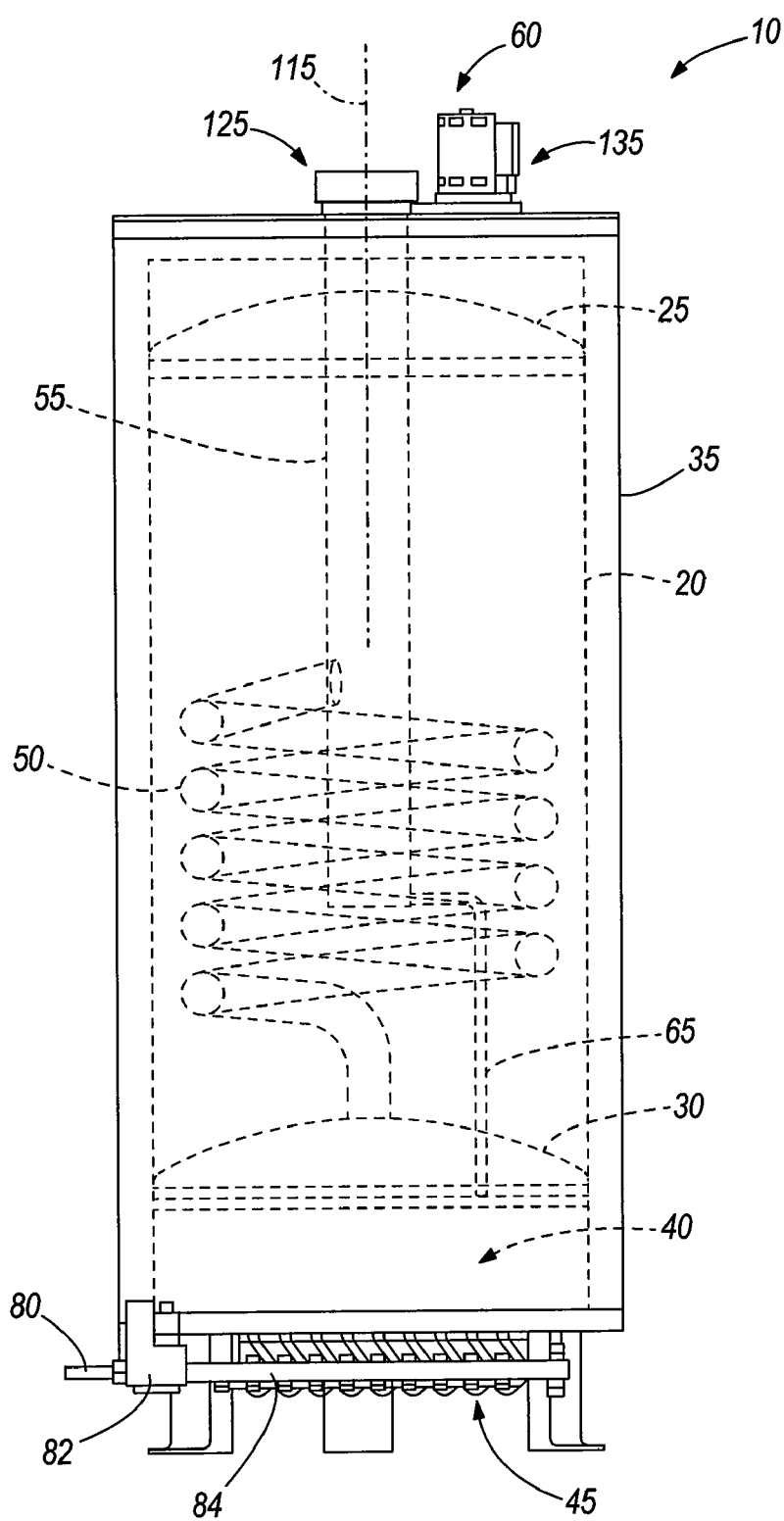
FIG. 1 is an elevation view of a water heater with a helical tube heat exchanger according to one embodiment of the present invention.

FIG. 1 illustrates a storage-type water heater 10 according to one embodiment of the present invention. The water heater 10 includes a tank 20 having a top head 25 and a bottom head 30. The tank 20 contains potable water and has a generally vertical center axis 115. The water heater 10 also includes an insulating jacket 35 surrounding the tank 20, an open combustion chamber 40 beneath the tank 20, a burner 45, a helical tube heat exchanger 50 fluidly connected to the chamber 40, a substantially straight flue tube 55 connected to the helical tube 50, a blower system 60 mounted on the top of the water heater 10, and a water tube 65 connected to the lower end of the flue tube 55. A water inlet pipe 70 and a water outlet pipe 75 (illustrated in FIGS. 2 and 3) direct cold water into the tank 20 and hot water out of the tank 20, respectively. It is to be understood that the water heater 10 described herein is only for exemplary purposes. Further, other types of water heaters fall within the scope of the invention.

During operation of the water heater 10, fuel (e.g., gas) is provided to the burner 45 through a conduit 80 and a valve 82. The fuel flows from the valve 82 to a manifold 84 for evenly distributing the fuel through the burner 45. The burner 45 generates hot gasses or products of combustion in the chamber 40 such that heat is exchanged between the products of combustion and water in the tank 20. More specifically, the products of combustion heat the bottom head 30, which in turn heats the adjacent water. The products of combustion then flow upwardly from the chamber 40, through the helical tube 50 and then through the flue tube 55 so that heat is exchanged between the products of combustion flowing within the tubes 50, 55 and the water around the tubes 50, 55.

In other words, the products of combustion flow in a direction defined from the lower portion to the upper portion of the tank 20.

In the illustrated construction, the lower end of the helical tube 50 is coupled to the center of the bottom head 30. Any suitable means, including welding, soldering or brazing can be used to connect the helical tube 50 to the bottom head 30. The lower end of the helical tube 50 is aligned with the center axis 115. Preferably, the entire helical tube 50 is centered on or defines a substantially constant radius around the axis 115. In addition, the flue tube 55 extends along the axis 115. Other configurations of the helical tube 50 and flue tube 55 with respect to the axis 115 and/or water heater 10 fall within the scope of the invention. In the illustrated construction, the tubes 50, 55 are manufactured of a steel material. However, the tubes 50, 55 can be manufactured with other suitable materials for promoting heat exchange between the products of combustion and the water within the tank 20. Suitable materials include, but are not limited to, aluminum, cooper and other metal alloys.

In the illustrated construction, the tubes 50, 55 include diameters ranging between about 2.5 inches and about five inches. Further, the helical tube 50 has a smaller diameter than the flue tube 55. It is to be understood that other dimensions (e.g., diameter) of the tubes 50, 55 fall within the scope of the invention. For example, it is contemplated that the tube 50 and the tube 55 include substantially the same diameter. In addition, it is within the scope of the invention that augmentation surfaces (e.g., baffles, fins) be incorporated to the tubes 50, 55 or other features of the water heater 10 to further promote heat exchange between the products of combustions flowing within the tubes 50, 55 and the water surrounding the tubes 50, 55.

Condensate water can form on the inner wall of the flue tube 55. To help avoid clogging or other problems associated with the forming of condensate water, the flue tube 55 forms a water condensation trap. More specifically, the flue tube 55 extends downwardly from where the helical tube 50 communicates with the flue tube 55, and the flue tube 55 has a closed lower end for collecting condensate water. To dispose of the condensate water, the water tube 65 is connected to the lower end of the flue tube 55 and directs the condensate water downwardly and through the bottom head 30 to the chamber 40. Generally, condensate water evaporates in the chamber 40. However, in an alternate embodiment, the water tube 65 can extend from the chamber 40 and out of the water heater 10 as illustrated with in FIGS. 2 and 3.

The blower system 60 includes a blower 125 and a motor 135 driving the blower 125. Although particular details of the blower 125 and motor 135 are not shown, the blower/motor combination is well known in the art of water heaters and further description is not necessary. The blower 125 communicates with the upper end of the flue tube 55 and increases and/or helps regulate the flow of the products of combustion from the chamber 40, through the helical tube 50 and the flue tube 55.

Figure 2:
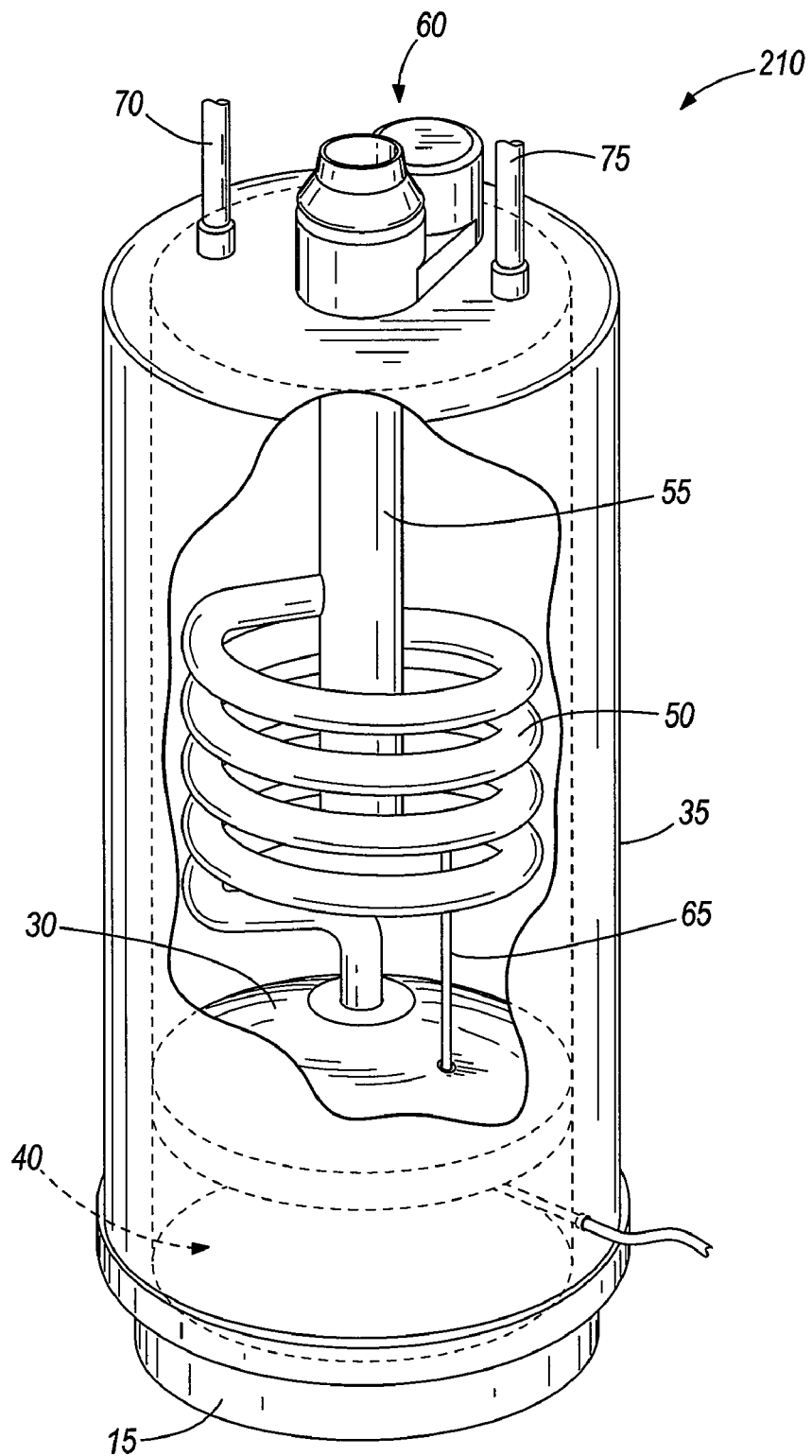
FIG. 2 is a perspective view of a water heater according to another embodiment of the present invention.
Figure 3:
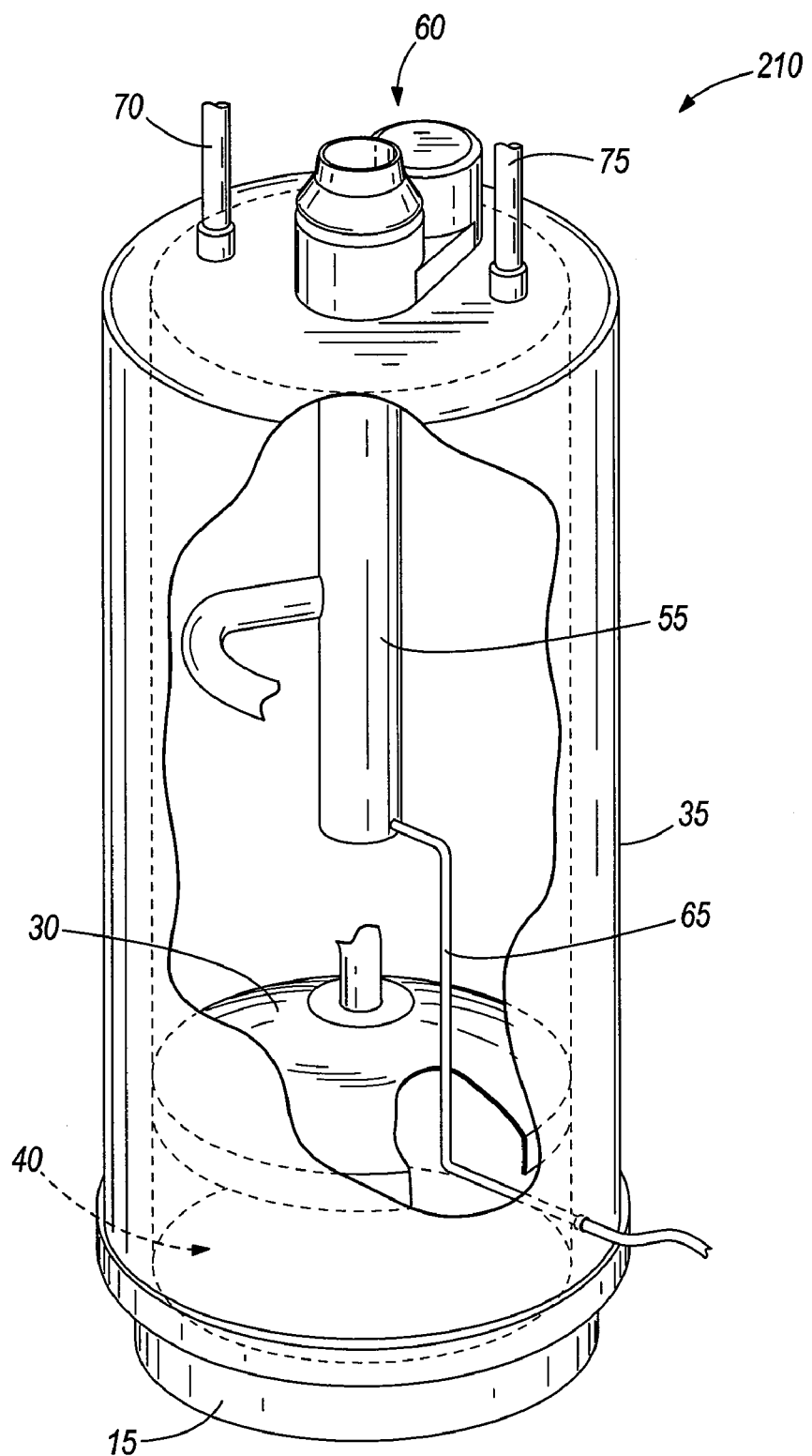
FIG. 3 is another perspective view of the water heater in FIG. 2 with additional parts cut away.

FIGS. 2 and 3 illustrate a water heater 210 according to an alternative embodiment of the present invention. The water heater 210 includes much of the same structure and has many of the same properties as the water heater 10 described above in connection with FIG. 1, and common elements have the same reference numerals. The following description focuses primarily upon the structure and features that are different from the water heater 10. Particularly, the water heater 210 includes a base pan 15 for supporting the water heater 210. Although not shown, the base pan 15 can include one or more apertures allowing air therethrough to the chamber 40 for generating products of combustion. In addition, the water tube 65 extends through the bottom head 30 and out of the jacket 35 from the combustion chamber 40 to a water disposal system (not shown). Other constructions of the water heaters 10, 210 can include the water tube 65 having a different configuration to dispose of the condensate water.

Figure 4:
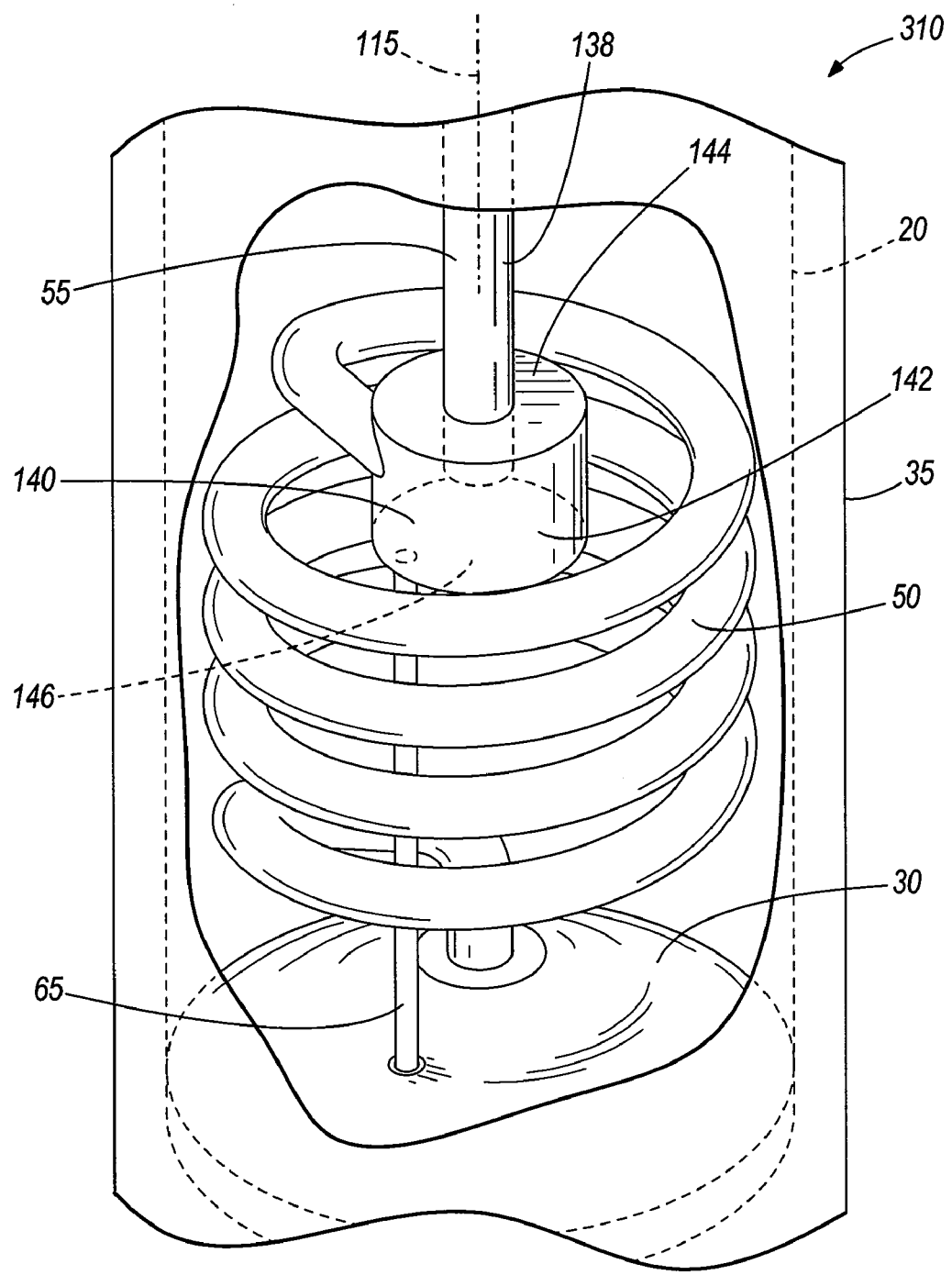
FIG. 4 is a partial perspective view of water heater according to another embodiment of the present invention.

FIG. 4 illustrates a water heater 310 according to an alternative embodiment of the present invention. The water heater 310 includes much of the same structure and has many of the same properties as the water heater 10 described above in connection with FIG. 1, and common elements have the same reference numerals. The following description focuses primarily upon the structure and features that are different from the water heater 10. Particularly, the flue tube 55 of the water heater 310 includes a tube portion 138 and a separation chamber 140 connected to the lower end of the tube portion 138. The separation chamber 140 defines the closed lower end of the flue tube 55. Particularly, the chamber 140 is defined by a substantially cylindrical wall 142 centered on the axis 115 and defining a diameter greater than the diameter of the tube portion 138. Thus, the separation chamber 140 has a greater cross-sectional area than the tube portion 138. In addition, the chamber 140 is defined by an upper wall 144 receiving the tube portion 138, and a lower wall 146 receiving the water tube 65 for disposing the condensate water.

The helical tube 50 is connected to the chamber 140 such that the products of combustion flow from the helical tube 50 to the chamber 140, and out of the chamber 140 to the tube portion 138 of the flue tube 55. In the illustrated construction, the helical tube 50 is tangentially connected to the chamber 140. In other words, the portion of the helical tube 50 connecting to the chamber 140 is substantially tangential to the cylindrical wall 142. Tangentially connecting the helical tube 50 to the chamber 140 causes the products of combustion entering the chamber 140 to define a substantially circular fluid motion therein. The swirling motion of the products of combustion within the chamber 140 helps separate condensate water from the products of combustion. Other embodiments of the water heater 310 include different connection arrangements between the helical tube 50 and the flue tube 55. For example, in one alternate embodiment, the connection of the helical tube 50 to the chamber 140 is not tangential.

It should be noted that the helical tube 50 of the water heater 10 could be tangentially connected to the flue tube 55.

Various features and advantages of the invention are set forth in the following claims.

What is claimed is:

1. A storage-type water heater comprising:
    a water storage tank having a generally vertical center axis and having upper and lower ends;
    a combustion chamber adjacent the lower end of the tank;
    a burner generating products of combustion in the combustion chamber;
    a substantially straight flue tube extending within the tank generally along the axis, the flue tube having a closed lower end and having an open upper end; and
    a helical tube heat exchanger within the tank, the helical tube being generally centered on the axis, the helical tube having an upper end communicating with the flue tube at a point between the upper and lower ends of the flue tube, and the helical tube having a lower end communicating with the combustion chamber such that the products of combustion flow from the combustion chamber into the helical tube, then into the flue tube and then out of the upper end of the flue tube;
    a portion of the flue tube extending downward from the point at which the helical tube communicates with the flue tube so as to form a condensing water trap in the closed lower end of the flue tube.

2. A storage-type water heater as set forth in claim 1 and further comprising a water tube extending from the lower end of the flue tube so that water collected in the lower end of the flue tube can flow out of the flue tube through the water tube.

3. A storage-type water heater as set forth in claim 2 wherein the water tube extends from the flue tube to the combustion chamber.

4. A storage-type water heater as set forth in claim 1 and further comprising a blower connected to the upper end of the flue tube to increase the flow of the products of combustion from the combustion chamber through the helical tube and the flue tube.

5. A storage-type water heater as set forth in claim 1 wherein the flue tube includes a separation chamber at least partially defining the lower end of the flue tube, and a tube portion extending upward from the separation chamber, the separation chamber having a greater cross-sectional area than the tube portion.

6. A storage-type water heater as set forth in claim 5 wherein the helical tube is tangentially connected to the separation chamber causing the products of combustion to define a substantially circular fluid motion within the separation chamber.

7. A storage-type water heater as set forth in claim 1 wherein the helical tube is tangentially connected to the flue tube.

8. A storage-type water heater comprising:
a tank enclosing a volume of water, the tank having an upper portion, an upper end, and a lower portion;
a chamber adjacent the lower portion of the tank and adapted to at least partially enclose a source of a heated fluid;
a helical tube heat exchanger at least partially enclosed within the tank and fluidly connected to the chamber, the helical tube directing the heated fluid from the lower portion to the upper portion of the tank and promoting heat exchange between the water in the tank and the heated fluid flowing through the helical tube; and
a flue tube between the helical tube and the upper end of the tank such that the heated fluid flows from the chamber through the helical tube and then through the flue tube.

9. A storage-type water heater as set forth in claim 8 wherein the source of heated fluid includes a burner, and wherein the heated fluid includes products of combustion.

10. A storage-type water heater as set forth in claim 8 and further comprising a blower in fluid communication with the flue tube to at least partially affect the flow of the heated fluid.

11. A storage-type water heater as set forth in claim 8 and further comprising a water tube connected between a lower portion of the flue tube and the chamber.

12. A storage-type water heater as set forth in claim 11 wherein the helical tube is connected to the flue tube above the water tube, and wherein the water tube is operable to conduct condensed water from the lower portion of the flue tube to the lower portion of the tank.

13. A storage-type water heater as set forth in claim 8 wherein the flue tube includes a separation chamber and a tube portion extending upward from the separation chamber, the separation chamber having a greater cross-sectional area than the tube portion.

14. A storage-type water heater as set forth in claim 13 wherein the helical tube is tangentially connected to the separation chamber causing the heated fluid to define a substantially circular fluid motion within the separation chamber.

15. A storage-type water heater as set forth in claim 8 wherein the helical tube is tangentially connected to the flue tube.

16. A storage-type water heater as set forth in claim 8 wherein the flue tube includes a closed lower end and an open upper end; and
wherein the helical tube includes an upper end communicating with the flue tube at a point between the upper and lower ends of the flue tube.

17. A water heater comprising:
a storage tank for containing water, the storage tank having an upper portion and a lower portion;
a burner chamber adjacent the lower portion of the tank and at least partially enclosing a burner for generating products of combustion;
a helical tube heat exchanger at least partially enclosed within the tank and fluidly connected to the burner chamber, the helical tube directing a flow of the products of combustion in a direction generally defined from the lower portion to the upper portion of the tank and promoting heat exchange between the water in the tank and the products of combustion flowing therethrough;
a substantially straight flue tube at least partially enclosed within the tank and extending upwardly to the upper portion of the tank, the helical tube being fluidly connected to the flue tube above a lower portion of the flue tube for directing the flow of the products of combustion from the lower portion of the tank to the upper portion of the tank;
a condensing water trap system including a water tube extending from the lower portion of the flue tube to the exterior of the tank, the condensing water trap system being operable to collect water condensed within the flue tube at the lower portion thereof and direct the condensed water through the water tube to the exterior of the tank; and
a blower coupled to the upper portion of the tank and fluidly connected to an upper portion of the flue tube, the blower being operable to affect the products of combustion to at least partially generate the flow of the products of combustion from the burner chamber through the helical tube and then through the flue tube.

18. A water heater as set forth in claim 17 wherein the flue tube includes a separation chamber at least partially defining the lower portion of the flue tube, and a tube portion extending upward from the separation chamber, the separation chamber having a greater cross-sectional area than the tube portion.

19. A water heater as set forth in claim 17 wherein the helical tube is tangentially connected to the flue tube.

20. A storage-type water heater comprising:
a tank enclosing a volume of water, the tank having an upper portion, an upper end, and a lower portion;
a chamber adjacent the lower portion of the tank and adapted to at least partially enclose a source of a heated fluid;
a helical tube heat exchanger at least partially enclosed within the tank and fluidly connected to the chamber, the helical tube directing the heated fluid from the lower portion to the upper portion of the tank and promoting heat exchange between the water in the tank and the heated fluid flowing through the helical tube; and
a blower in fluid communication with the helical tube and coupled to the upper end of the tank, the blower being operable to increase the flow of the heated fluid from the chamber and through the helical tube.

21. A storage-type water heater as set forth in claim 20 wherein the source of heated fluid includes a burner, and wherein the heated fluid includes products of combustion.

* * * * *

UNITED STATES PATENT AND TRADEMARK OFFICE
CERTIFICATE OF CORRECTION

| | | |
|---|---|---|
| PATENT NO. | : 8,161,918 B2 | |
| APPLICATION NO. | : 12/197831 | |
| DATED | : April 24, 2012 | |
| INVENTOR(S) | : Hongfei Ma et al. | |

It is certified that error appears in the above-identified patent and that said Letters Patent is hereby corrected as shown below:

Title Page;

(73) Assignee:

change "Aos Holding Company" to --AOS Holding Company--

Signed and Sealed this
Tenth Day of July, 2012

David J. Kappos
*Director of the United States Patent and Trademark Office*